R. H. KIRK.
FREEZING PLATE.
APPLICATION FILED SEPT. 14, 1908.

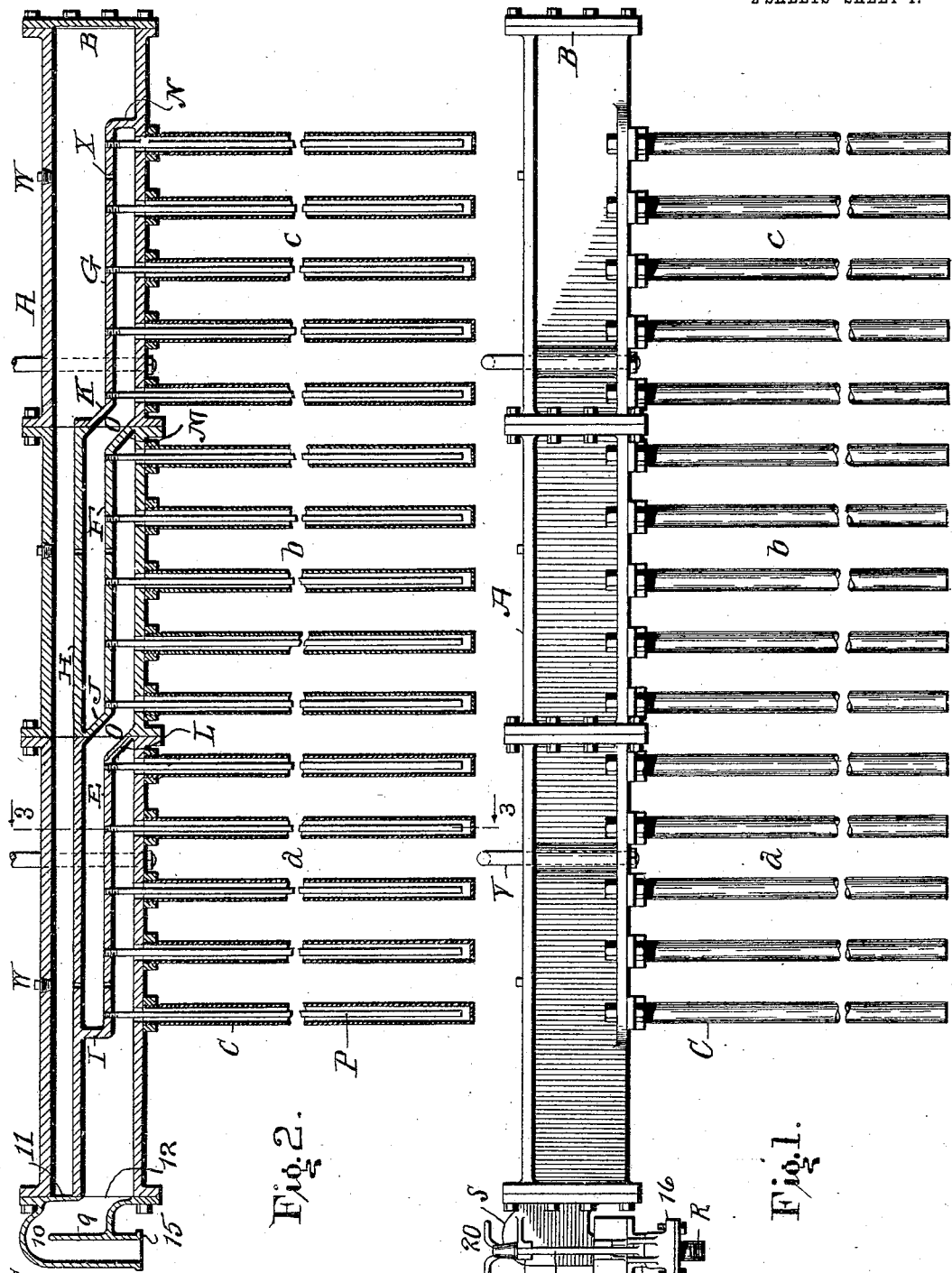

938,061.

Patented Oct. 26, 1909.
2 SHEETS—SHEET 2.

Witnesses:
C. H. Bertholf
May T. McLarry

Inventor
Robert H. Kirk
By his Attorney
Park Benjamin

UNITED STATES PATENT OFFICE.

ROBERT H. KIRK, OF BROOKLYN, NEW YORK.

FREEZING-PLATE.

938,061.  Specification of Letters Patent.  Patented Oct. 26, 1909.

Application filed September 14, 1908.  Serial No. 452,910.

*To all whom it may concern:*

Be it known that I, ROBERT H. KIRK, a citizen of the United States, residing at Brooklyn, in the county of Kings and State of New York, have invented a certain new and useful Improvement in Freezing-Plates, of which the following is a specification.

The invention relates to freezing plates for plate ice and more particularly to the kind of freezing plate in which is comprised a header and a plurality of tubes carried thereby, through which header and tubes refrigerating liquid is caused to circulate.

The invention consists in the construction hereinafter set forth, whereby the header may be disconnected from both the inlet and outlet pipes for the refrigerating liquid at the same time, so as to permit of ready removal of the plate from the freezing tank, and whereby the liquid remaining in the header is trapped therein and the entrance of air prevented.

Figure 3:
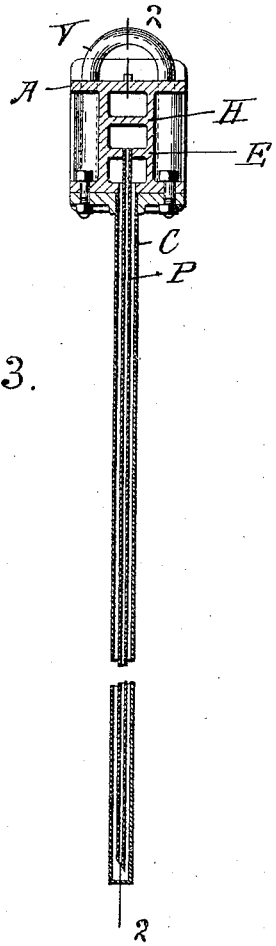
Figure 4:
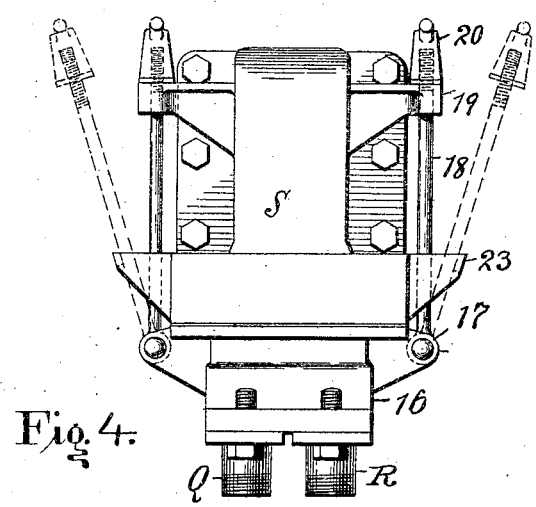
Figure 5:
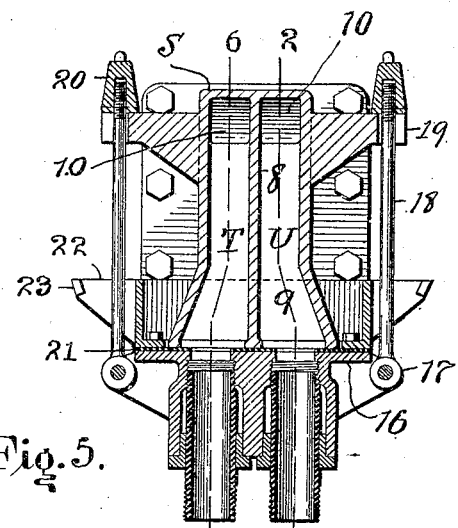
Figure 7:
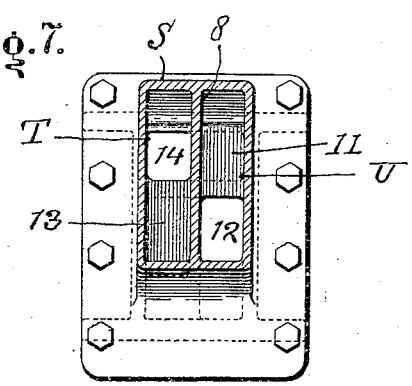
Figure 6:
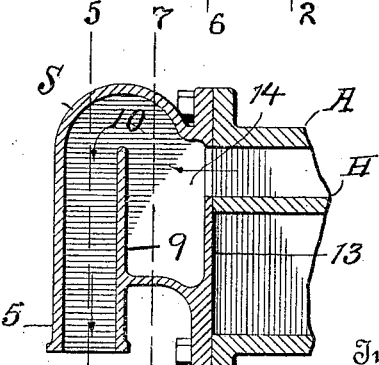

In the accompanying drawings—Figure 1 is a side elevation of my improved freezing plate. Fig. 2 is a vertical section on the line 2, 2, of Figs. 3 and 5. Fig. 3 is a vertical section on the line 3, 3, of Fig. 2. Fig. 4 is an end elevation showing the mode of connection of the header to the inlet and outlet pipes for the fluid refrigerant or thawing off liquid. Fig. 5 is a section on the line 5, 5, of Fig. 6. Fig. 6 is a section on the line 6, 6, of Fig. 5. Fig. 7 is a section on the line 7, 7, of Fig. 6.

Similar numbers and letters of reference indicate like parts.

A is the header, closed at B, and preferably formed in three sections flanged and bolted together. To the bottom of the header are secured, by any suitable means, the vertical freezing tubes C, which are closed at their lower ends, and form three groups $a, b, c$. Within the header are the following partitions. Three horizontal partitions E, F, G in the same plane and respectively disposed above the tube groups $a, b, c$. A single horizontal partition H which extends over the horizontal partitions E, F, and is connected by the short partitions I, J, K with the ends of the partitions E, F, G. The opposite ends of the partitions E, F, G are connected by short partitions L, M, N with the bottom of the header. Passages O are left between the parallel short partitions J and L and K and M. Secured in the horizontal partitions E, F, G are tubes P which extend into and nearly to the bottom of tubes C.

To the end of the header A is secured, by bolts and flanges, the device whereby said header is detachably connected to the supply and exhaust pipes Q, R. Said device consists of a casing S divided into two passages T, U, by a middle partition 8. There is also a transverse partition 9 which extends upwardly to a point above the inner surface of the upper horizontal wall of the header, so that there is a free space 10 above said partition in each passage T, U. On the side of the casing which is bolted to the header are two partitions, disposed respectively in the passages T, U. One of these partitions 11, Figs. 2 and 7, when the casing is in place on the header, closes communication between passage U and the space in the header above the horizontal partition H, so that an opening 12 is left between said passage and the space in the header below said partition. The other partition 13, Figs. 6 and 7, closes communication between passage T and the space in the header below partition H, so that an opening 14 is left between said passage and the space in said header above said partition H.

A portion 15 of the casing S extends downwardly and its bottom opening, when the header is to be connected to the stationary pipes Q, R, comes directly over the upper ends of said pipes, which, as shown in Figs. 4 and 5, are secured in a saddle 16. Said saddle is attached to any suitable support. On the sides of the saddle 16 are lugs 17 to which are pivoted the lower ends of swinging rods 18. On the casing are pairs of lugs 19, which receive the rods 18 when brought into vertical position. On the threaded ends of said rods 18, above lugs 19, are nuts 20, by screwing down which the casing is forced downwardly upon the saddle 16 and preferably upon an interposed packing gasket 21, so that in this way a tight joint is made between said saddle and said casing. On the casing are side projections 22 having stops 23, which, when the rods 18 are released from the lugs 19 and swung outwardly, serve to hold up said rods, as shown in dotted lines, Fig. 4.

The operation of the apparatus is as follows: The freezing plate formed by the header and tubes being inserted in the usual tank containing the water to be frozen, and the portion 15 of the casing then coming in place on the saddle 16, the rods 18 are moved into the position shown in Fig. 5, and the nuts 20 are set up. The refrigerating liquid from pipe R then passes into passage U of casing S, and out at opening 12 to the space in the header which communicates with group $a$ of tubes C; thence down said tubes C; hence by the inner tubes P to the space between partition E and partition H; thence by passage O to the second group $b$ of tubes C; hence by he inner tubes P to the space between partition F and partition H; thence to the third group $c$ of tubes C; thence by the inner tubes P to the space above partitions H and G; thence by opening 14 to passage T in casing S, and thence to pipe Q. Of course, the circulation may be in the reverse direction, that is to say, pipe Q to pipe R instead of as above described. After the ice cake has been formed on the tubes C, the freezing plate with the cake still adherent to the tubes, may be lifted from the tank by any hoisting apparatus attached to the loops V. To permit this, all that is necessary is to loosen the nuts 20, thus releasing rods 18, and so freeing the header A from both pipes Q, R, at onec. The partition 9 in casing S is carried up to the level before noted in order that any refrigerating liquid in the header may be trapped therein when the header is disconnected from the pipes Q, R, as described. The object is to prevent entrance of air into the header and freezing tubes. Whenever it is desirable for any purpose to remove air from the header, this may be done by removing the screw plugs W, Fig. 2, in the upper header wall, there being openings as X in the several horizontal positions.

Especial attention is called to the fact that through the arrangement of the partitions and passages in the header, the fluid circulation is always in the same direction in the outer tubes C and in the reverse direction in the inner tubes P, and also that the fluid first descends through the outer tubes and then rises through the inner tubes. I have found by actual experiment, that when the refrigerating fluid first passes through the outer tubes and then through the inner tubes, thicker ice per given time is produced than when the fluid first passes down through the inner tubes and then rises through the outer tubes. If, therefore, the construction were such for example, that in one group of tubes the fluid passed first through the outer tubes and then through the inner tubes, and in another group of tubes, the fluid passed first through the inner tubes and then through the outer tubes, the ice cake formed in a given time on both groups of tubes would be thicker on the first group of tubes than on the second. This is obviously objectionable, since the cake would not be of uniform thickness. This difficulty is wholly obviated by my present construction.

I claim:

1. In a removable freezing plate of the kind described, a header closed at one end and having two openings in its opposite end, partitions in said header and two groups of freezing tubes carried by said header: the aforesaid partitions and tubes being constructed and arranged so that fluid entering one of said header openings may circulate through said two groups of tubes successively and through said header and escape at the other header opening.

2. In a removable freezing plate of the kind described, a header closed at one end, a casing secured to said header at the opposite end, a partition in said casing dividing the same into two passages, each communicating with said header, stationary inlet and outlet pipes, and means for detachably connecting the passages in said casing to said pipes respectively.

3. In a removable freezing plate of the kind described, a header closed at one end, a casing secured to said header at the opposite end and internally constructed to form a trap for liquid in said header, a partition in said casing dividing the same into two passages, each communicating with said header, stationary inlet and outlet pipes, and means for detachably connecting said casing to said pipes respectively: the aforesaid parts being constructed and arranged so that upon the connection of said casing and said pipes, said pipes respectively communicate with said passages.

4. In a removable freezing plate of the kind described, a header closed at one end, a casing secured to said header at the opposite end, a partition in said casing dividing the same into two passages, each communicating with said header, vertical stationary inlet and outlet pipes, a saddle receiving the upper ends of said pipes, and means for detachably connecting said casing to said saddle: the aforesaid parts being constructed and arranged so that upon the connection of said casing and said saddle, said pipes respectively communicate with said casing passages.

5. In a removable freezing plate of the kind described, a header, a plurality of tubes carried by said header and communicating therewith and closed at their lower ends, a plurality of tubes supported within said first named tubes opening into said header at their upper ends and into said first named tubes at their lower ends, and partitions and passages in said header: the aforesaid parts being constructed and arranged so that fluid circulating through said header and tubes shall pass in the same direction in all the outer tubes and in the reverse direction in all the inner tubes.

In testimony whereof I have affixed my signature in presence of two witnesses.

ROBERT H. KIRK.

Witnesses:
   GERTRUDE T. PORTER,
   MAY T. McGARRY.